April 4, 1967  D. S. STRADER  3,312,150

PISTON CONSTRUCTION

Filed Nov. 18, 1964  2 Sheets-Sheet 1

INVENTOR.
Don S. Strader
BY
Atty.

April 4, 1967  D. S. STRADER  3,312,150
PISTON CONSTRUCTION
Filed Nov. 18, 1964  2 Sheets-Sheet 2
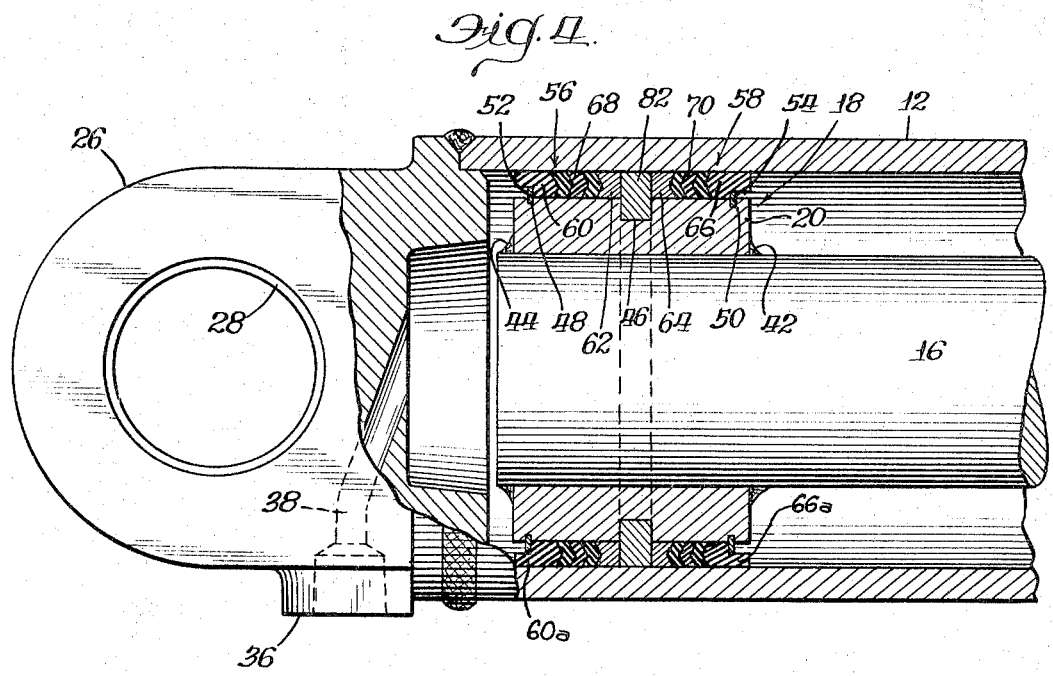
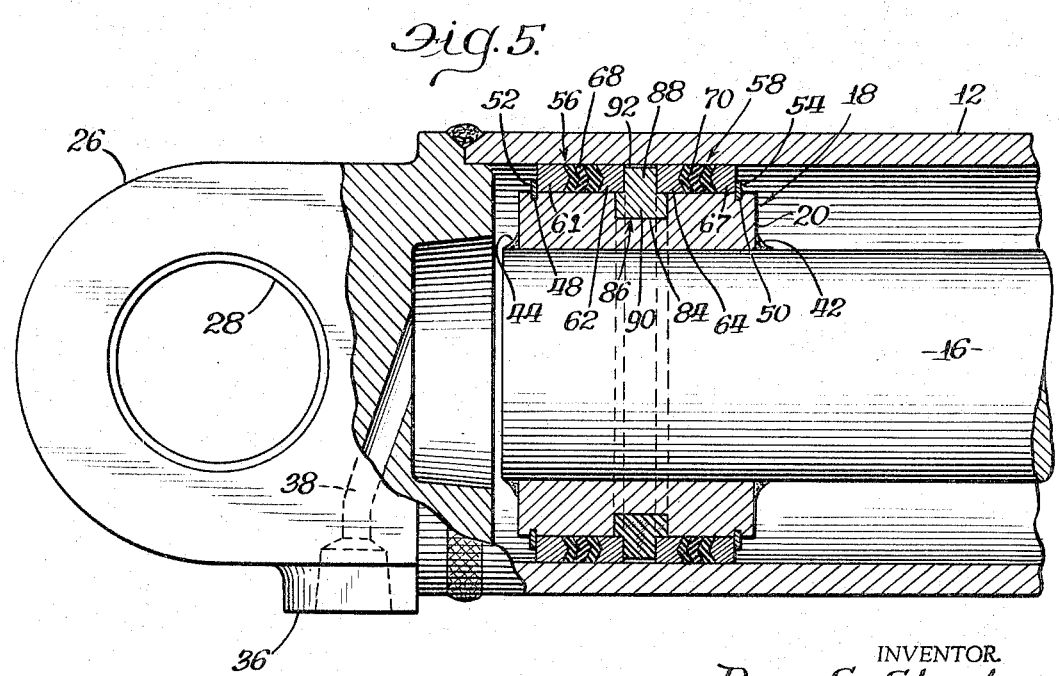
INVENTOR.
Don S. Strader
BY
Atty.

United States Patent Office 3,312,150
Patented Apr. 4, 1967

---

3,312,150
PISTON CONSTRUCTION
Don S. Strader, Salt Lake City, Utah, assignor to International Harvester Company, a corporation of Delaware
Filed Nov. 18, 1964, Ser. No. 412,035
4 Claims. (Cl. 92—252)

This invention relates generally to reciprocating hydraulic motors and more specifically relates to the construction of pistons therefor.

An object of this invention is to provide a new and improved piston construction for a reciprocating hydraulic motor which is relatively simple to construct and assemble using continuous ring sealing members.

Another object of this invention is to provide a novel construction for a reciprocating hydraulic motor wherein a one piece piston head is utilized which is readily assembled from either side of the piston and which requires a minimum of parts.

Still another object of this invention is to provide an improved piston for a reciprocating hydraulic motor in which continuous annular support is supplied for the sealing members with a consequent increase in reliability of the hydraulic motor.

Another object of this invention is to provide a piston construction for a reciprocating hydraulic motor in which a split bearing ring provides support for another bearing ring which in turn provides continuous annular support for sealing members.

Another object of this invention is to provide a piston construction for a reciprocatnig hydraulic motor in which a split retainer ring supports a bearing ring which in turn supports sealing members, and in which a resilient member positions the retainer ring on the piston.

Another object of this invention is to provide a piston construction for a reciprocating hydraulic motor wherein a split retainer ring provides support for a bearing ring which in turn provides support for sealing members and in which the bearing ring positions the retainer ring on the piston.

Another object of this invention is to provide a piston construction for a reciprocating hydraulic motor in which packing sets are positioned between a retainer ring and snap rings on the piston and in which bearing rings of the packing sets limit radial movement of the snap rings.

Other objects of this invention will become apparent from the following specification and drawing, in which:

FIGURE 4 is a view similar to FIGURE 2 but showing another embodiment of the present invention; and FIGURE 5 is a view similar to FIGURE 2 but showing still another embodiment of the present invention.

Generally, the present invention provides a reciprocating hydraulic motor with a piston head rigidly attached to a piston rod and slidably carried in a cylinder. Hydraulic fluid under pressure is provided at either end of the cylinder to move the piston assembly in the desired direction.

Figure 2:
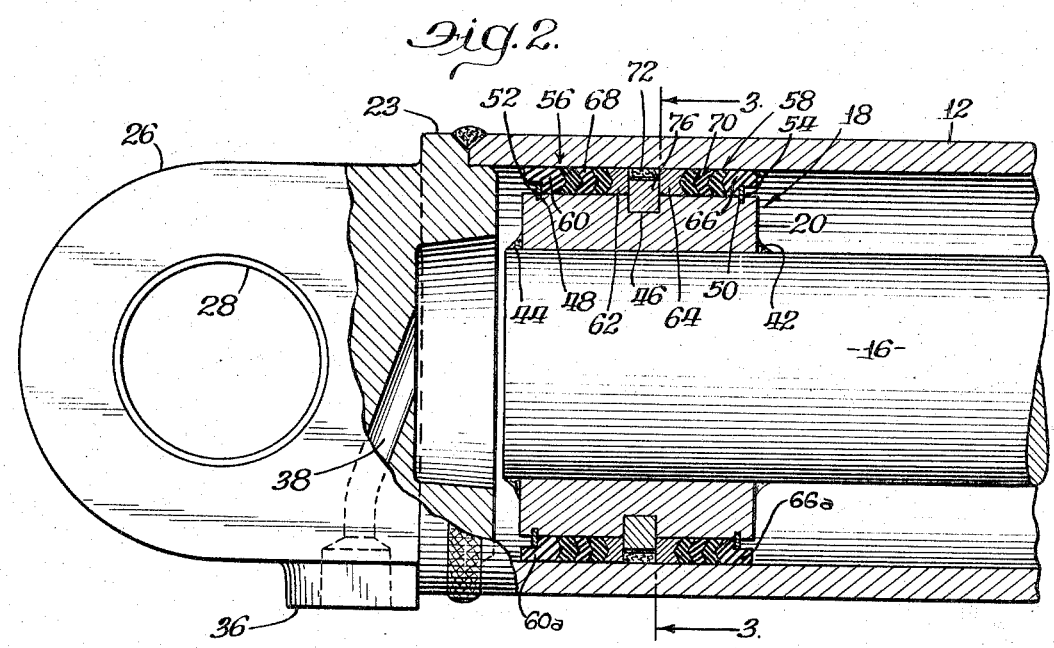
FIGURE 2 is an enlarged partial view of the device shown in FIGURE 1 and taken partially in cross-section.

The novel piston construction of the present invention provides three spaced-apart grooves on the periphery of the piston. A retainer ring, which is diametrically split into two portions, is positioned in the center groove. Two sets of packing assemblies are carried on the piston, one from either side of the split retainer ring. The packing sets each consist of sealing rings positioned between male and female adapters, which are bearing rings. One of the bearing rings of each packing set engages a side of the split ring, while the other of the bearing rings engages a snap ring which in turn is positioned in one of the end grooves on the piston. Radial movement of the snap ring is limited by an annular shoulder on the adjacent bearing ring. In the embodiment shown in FIGURE 2 the split retainer ring is encircled by a wear ring which holds the split ring in place. In the embodiment shown in FIGURE 4 the need for the wear ring of FIGURE 2 is obviated as the split retainer ring is itself a bearing ring and is in contact with the cylinder walls. In the embodiment shown in FIGURE 5 the need for a wear ring is also obviated because the split ring is held in position by the adjacent bearing rings. In all three embodiments the split retainer rings provide support in an axial direction for the bearing rings which in turn provide continuous annular support for the sealing rings. The sealing rings will last longer and be more reliable where they have continuous annular support from the bearing rings. This is because the bearing rings have a continuous annular surface engaging the end surface of the sealing rings, whereas in conventional designs a split bearing ring will have an interrupted annular surface engaging the sealing rings.

Figure 1:
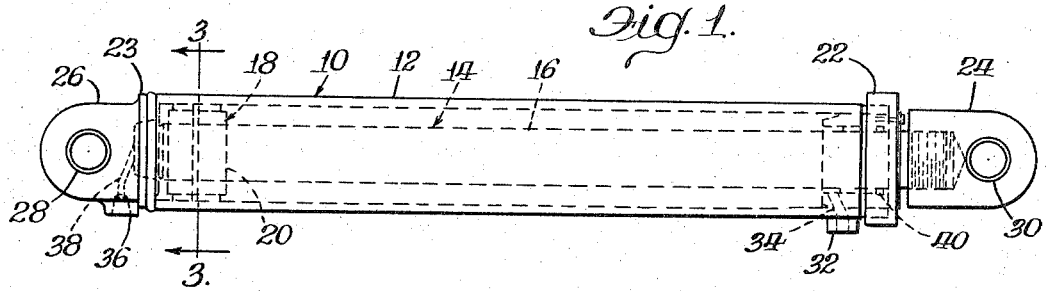
FIGURE 1 is a side elevation view of a reciprocating hydraulic motor embodying one form of the present invention.

In detail, and referring to the drawings, FIGURE 1 shows a reciprocating hydraulic motor shown generally by the numeral 10. The motor 10 has a cylinder portion 12 which defines a smooth internal bore. Slidably carried within the cylinder 12 is the piston assembly 14, which consists of piston rod 16 to which piston head assembly 18 is rigidly attached to one end thereof by suitable means such as welding. The cylinder 12 is closed at its head end by end member 23 which is secured thereto by suitable means such as welding. The rod end of cylinder 12 is closed by end member 22 which is also secured by any suitable means. Any suitable sealing member 40 is provided between rod 16 and end member 22. Hydraulic fluid is admitted to the head end of cylinder 12 through port 36 and passageway 38, while hydraulic fluid is admitted to the rod end of cylinder 12 through port 32 and passageway 34. To mount the hydraulic motor on the desired equipment, such as a tractor loader, brackets 24 and 26 are provided. Bracket 24 is attached to piston rod 16 and has a bearing 30 therein for attachment to a pivot pin (not shown). Bracket 26 is attached to end member 23 and has a bearing 28 therein for attachment to another pivot pin (not shown).

The piston head assembly 18 for one embodiment of this invention is shown in greater detail in FIGURE 2. Piston head 20 is rigidly secured to piston rod 16 by welds indicated at 42 and 44. A large groove 46 is cut into piston head 20 intermediate the base portions thereof. Retaining ring 76 is placed in groove 46 and may be made of a hard durable material such as steel. Retaining ring 76 is split along a diameter thereof so that the two semi-circular halves may be placed together to define a complete ring. Constructing the retainer ring in this manner allows simple and fast assembly onto piston head 20. A wear ring 72 is provided in the space between the outer surface of retainer ring 76 and the inner surface of cylinder 12. The wear ring is made of a resilient material such as molded fabric and is separated at any convenient point along its circumference to allow easy assembly. When assembled, wear ring 72 will hold retainer ring 76 into the proper position in groove 46. Wear ring 72 will also present a durable wearing surface against cylinder 12 as the piston assembly 18 reciprocates.

Packing set 56 is provided between the inner surface of cylinder 12 and the outer surface of the head end of piston head 20, and consists of bearing ring 60 (male adapter), bearing ring 62 (female adapter) and sealing rings 68. Similarly, packing set 58 is provided between the inner surface of cylinder 12 and the outer surface of the rod end of piston head 20, and consists of bearing ring 66 (male adapter), bearing ring 64 (female adapter) and sealing rings 70. The bearing rings 60, 62, 64 and 66 are made of a suitable bearing material such as bronze.

The sealing rings 68 and 70 are substantially V-shaped in cross-section, and are formed of a fabric material impregnated with a resilient material such as rubber or neoprene. Bearing rings 62 and 64 are in contact with, and supported by, retainer ring 76.

Bearing rings 60 and 66 are spaced axially from bearing rings 62 and 64, respectively, and are held against axial displacement by snap rings 52 and 54, respectively. The snap rings 52 and 54 are in turn positioned in grooves 48 and 50. The bearing rings 60 and 66 are provided with annnular shoulders 60a and 66a, respectively. The inner diameter of the shoulder 60a is substantially equal to the outer diameter of snap ring 52 while the inner diameter of shoulder 66a is substantially equal to the outer diameter of snap ring 54. The shoulders 60a, 66a are in overlapping locking engagement with their respective snap rings and serve to prevent the rings from expanding when axial forces are applied on the piston. Without the shoulders of applicant's invention failure of the assembly 18 would occur should the snap rings expand sufficiently to disengage from their respective grooves.

Sealing rings 68 are positioned about piston head 20 between bearing rings 60 and 62, while sealing rings 70 are positioned about piston head 20 between bearing rings 64 and 66. Because rings 60, 62, 64 and 66 are continuous around their circumference, they will provide continuous support for sealing rings 68 and 70. Retainer ring 76 will provide the support for bearing rings 62 and 64, and yet can be readily assembled or disassembled on the piston head.

The piston head assembly 18 is initially assembled before insertion into cylinder 12. Firstly, packing sets 56 and 58 are mounted about the outer surface of piston head 20. Snap rings 52 and 54 are then inserted in grooves 48 and 50, respectively, and packing sets 56 and 58 are positioned as shown with shoulders 60a and 66a retaining the snap rings in place. Split retainer ring 76 is inserted into groove 46, and then wear ring 72 is placed around the outer circumference of the retainer ring 76. The piston assembly 18 may then be inserted in the cylinder 12 for reciprocating movement therein.

Figure 3:
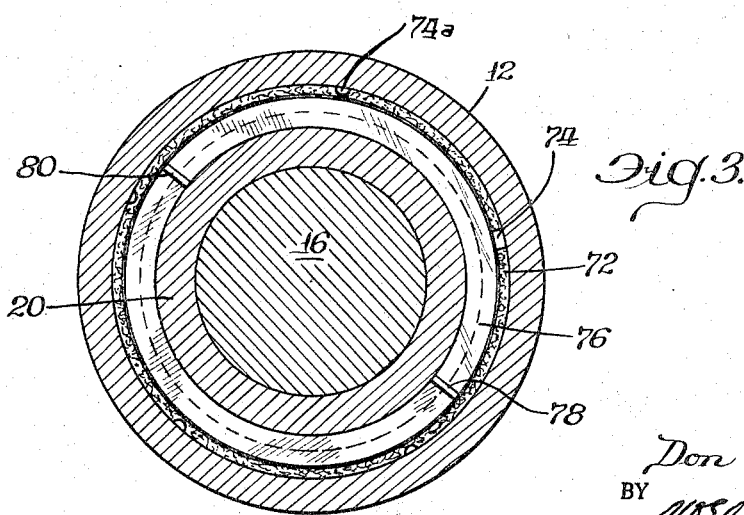
FIGURE 3 is a cross-section view of the device shown in FIGURE 2 and taken along the line 3—3 of FIGURE 2.

FIGURE 3 is a cross-section view of the embodiment shown in FIGURE 2 and shows details of the retainer ring and wear ring. Retainer ring 76 is shown in position about piston head 20. Diametrically opposed cuts 78 and 80 are made to provide a split ring. Wear ring 72 is shown in position about retainer ring 76 and is cut at 74 to allow easy assembly and disassembly. Notches 74a are provided to prevent oil from being trapped behind the packing set, and to assure free flow of lubricating oil for the bearing rings 62 and 64.

In the embodiment shown in FIGURE 4 a different type of retainer ring is provided. The piston head assembly 18 is similar to that described above in connection with the embodiment of FIGURE 2. However, retainer ring 82 is positioned in groove 46 and extends radially outward to bear against the inner surface of cylinder 12. The retainer ring 82 is made of a bearing material, such as bronze, and is split about its diameter to provide easy assembly and disassembly. The packing sets 56 and 58 are identical to those described in connection with FIGURE 2. The split retainer ring 82 provides support for bearing rings 62 and 64 which in turn provide continuous annular support for sealing rings 68 and 70, respectively. Snap rings 52 and 54 are positioned in grooves 48 and 50, respectively, and hold bearing rings 60 and 66 in place in the usual manner. Shoulders 60a and 66a limit radial movement of snap rings 52 and 54. In the embodiment of FIGURE 4 it is apparent that split retainer ring 82 now serves the dual purpose of providing a bearing surface against the inner surface of cylinder 12 and also supporting bearing rings 62 and 64.

The piston head assembly 18 of the embodiment of FIGURE 4 is assembled in like manner to that explained in connection with FIGURE 2, execept that a wear ring is not used.

In the embodiment of FIGURE 5 yet another retainer ring 86 is provided. In this embodiment packing sets 56 and 58 are similar to those described in connection with FIGURES 2 and 4 except that no shoulders are provided on bearing rings 61 and 67. Retainer ring 86 is made of a hard durable material, such as steel, and is constructed in two distinct portions. Lower portion 90 is positioned in groove 84 and has a height which is equal to the depth of groove 84. Upper portion 88 of retainer ring 86 is integral with lower portion 90 and extends radially outwardly towards the inner surface of cylinder 12. The width of upper portion 88 is less than the width of lower portion 90 so that shoulders are formed at either side of retainer ring 86. With packing sets 56 and 58 in position the bearing rings 62 and 64 will extend over the shoulders formed in bearing ring 86, and will prevent radial movement of retainer ring 86 relative to piston head 20. A space 92 is provided between the outer surface of retainer ring 86 and the inner wall of cylinder 12 to prevent scoring thereof. The bearing ring 86 is split along its diameter to provide easy assembly and disassembly. Retainer ring 86 will provide support for bearing rings 62 and 64 which in turn will provide continuous annular support for sealing rings 68 and 70, respectively. Bearing rings 61 and 67 are provided around the periphery of cylinder head 20 and are held in place by snap rings 52 and 54 which are assembled in grooves 48 and 50, respectively. The cylinder head construction of the embodiment of FIGURE 5 will provide continuous axial support along the circumference of sealing rings 68 and 70. The bearing rings are supported by the retainer ring which in turn is positioned on the cylinder head by engagement with the bearing rings. The need for a wear ring in this embodiment is therefor obviated.

The piston head assembly 18 is initially assembled by positioning retainer ring 86 in groove 84. The packing sets 56 and 58 are then mounted on piston head 20 in overlapping engagement with the retainer ring. Snap rings 52 and 54 are then inserted in grooves 48 and 50, respectively, and the assembly 18 may then be inserted in cylinder 12.

It is understood that the present embodiments are preferred embodiments and that various changes can be made in the details, material and arrangement of parts without departing from the spirit and scope of the present invention as defined in the appended claims.

What I claim is:
1. A piston assembly for a reciprocating hydraulic motor comprising:
 (a) a piston rod,
 (b) a piston secured to said rod,
 (c) said piston having a groove around its periphery,
 (d) a split ring with a first portion positioned in said groove and a second portion extending radially outwardly beyond the surface of said piston, said second portion having a width less than the width of said first portion,
 (e) at least one bearing ring on said piston engaging said split ring,
 (f) sealing ring means engaging said bearing ring for providing a hydraulic fluid seal between said piston and a cylinder wall of said motor, and
 (g) additional ring means for locking said sealing ring means on said bearing ring.

2. A piston assembly as defined in claim 1 in which an inner surface of said bearing ring contacts the first portion of said split ring and a side surface of said bearing ring contacts the second portion of said split ring.

3. A piston assembly as defined in claim 2 in which the outer surface of said split ring is spaced from the inner surface of said cylinder wall.

4. A piston assembly for a reciprocating hydraulic motor comprising:
 (a) a piston rod,
 (b) a piston secured to said rod,
 (c) said piston having a groove around its periphery,
 (d) a split ring with a first portion positioned in said groove and a second portion with a width less than said first portion extending radially outwardly beyond the surface of said piston,
 (e) bearing means for providing a bearing surface between said piston and the cylinder of said motor,
 (f) said bearing means engaging said first portion of said split ring for preventing radial movement of said split ring relative to said piston,
 (g) sealing ring means engaging said bearing ring means for providing a hydraulic fluid seal between said piston and the cylinder wall, and
 (h) additional ring means for locking said sealing ring means on said bearing means.

References Cited by the Examiner

UNITED STATES PATENTS

| 2,402,268 | 6/1946 | Young | 92—244 |
| 3,066,001 | 11/1962 | Zimmerman | 92—252 |
| 3,115,071 | 12/1963 | Strader | 92—257 |

FOREIGN PATENTS 1,315,525   12/1962   France.

MARTIN P. SCHWADRON, *Primary Examiner.*

G. N. BAUM, *Assistant Examiner.*